F. WEGNER.
FEEDING MECHANISM.
APPLICATION FILED OCT. 30, 1907. RENEWED JUNE 6, 1910.

964,721.

Patented July 19, 1910.
3 SHEETS—SHEET 1.

F. WEGNER.
FEEDING MECHANISM.
APPLICATION FILED OCT. 30, 1907. RENEWED JUNE 6, 1910.
964,721.
Patented July 19, 1910.
3 SHEETS—SHEET 2.
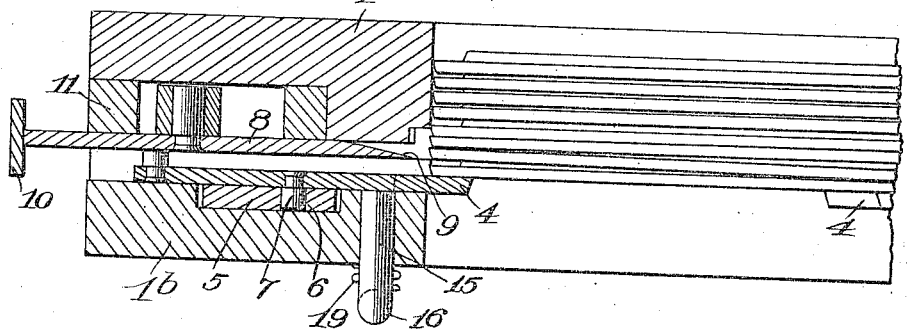
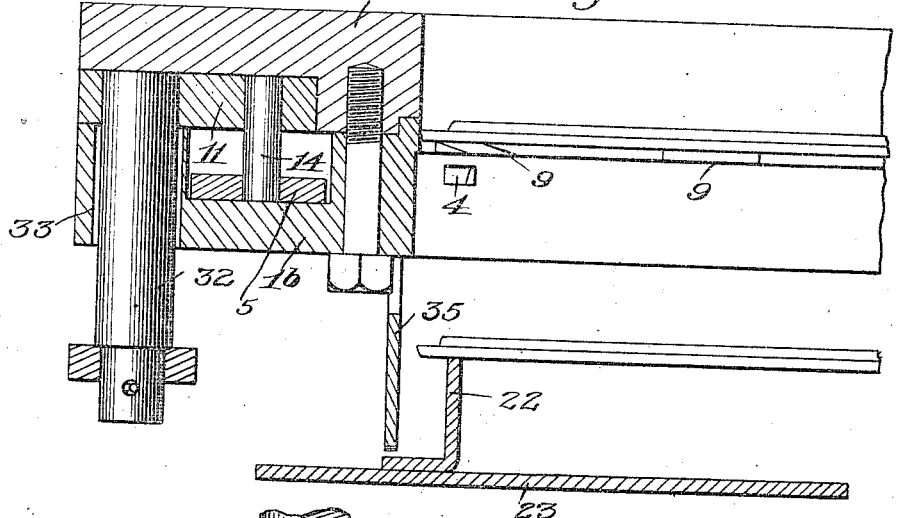
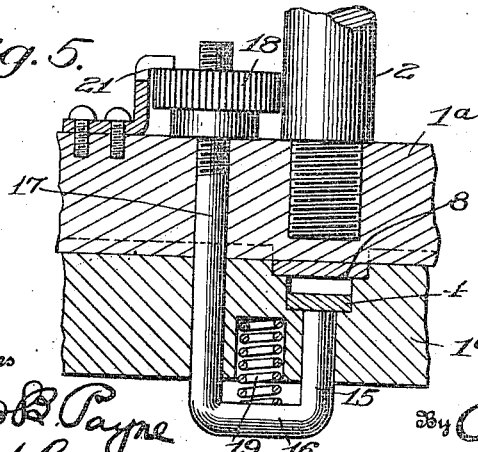

UNITED STATES PATENT OFFICE.

FRED WEGNER, OF FAIRPORT, NEW YORK, ASSIGNOR TO SANITARY CAN COMPANY, OF FAIRPORT, NEW YORK, A CORPORATION OF NEW YORK.

FEEDING MECHANISM.

964,721.  Specification of Letters Patent.  Patented July 19, 1910.

Application filed October 30, 1907, Serial No. 399,952. Renewed June 6, 1910. Serial No. 565,382.

*To all whom it may concern:*

Be it known that I, FRED WEGNER, of Fairport, in the county of Monroe and State of New York, have invented certain new and useful Improvements in Feeding Mechanisms; and I do hereby declare the following to be a full, clear, and exact description of the same, reference being had to the accompanying drawings, forming a part of this specification, and to the reference-numerals marked thereon.

The present invention relates to feeding mechanism of the type in which articles are arranged in a hopper and are singly discharged therefrom, being herein shown as adapted for articles made from sheet metal, such as can heads or tops; and it has for an object to provide an apparatus which will effectively separate the articles which will effectively separate the articles from a column or pack and deliver them singly and in an orderly manner.

A further object is to provide a machine which can be adjusted to feed articles of any thickness within two limits.

To these and other ends the invention consists in certain improvements and combinations of parts all as will be hereinafter more fully described, the novel features being pointed out in the claims at the end of the specification.

Figure 1:
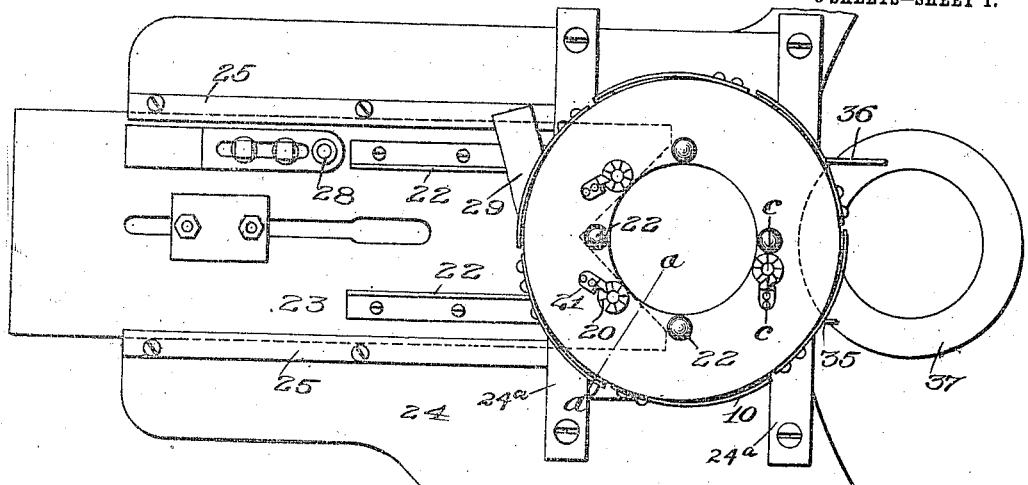
Figure 2:
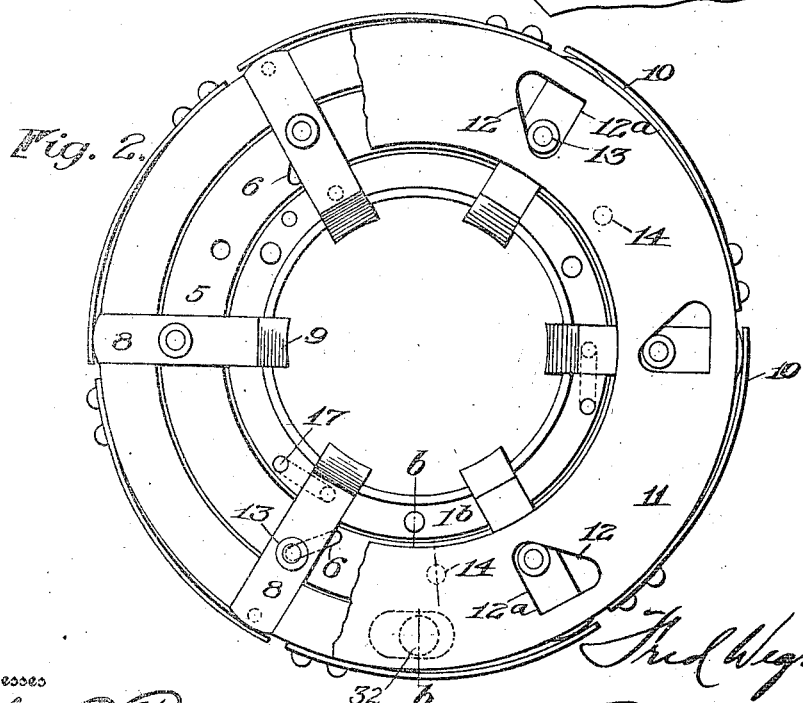
Figure 6:
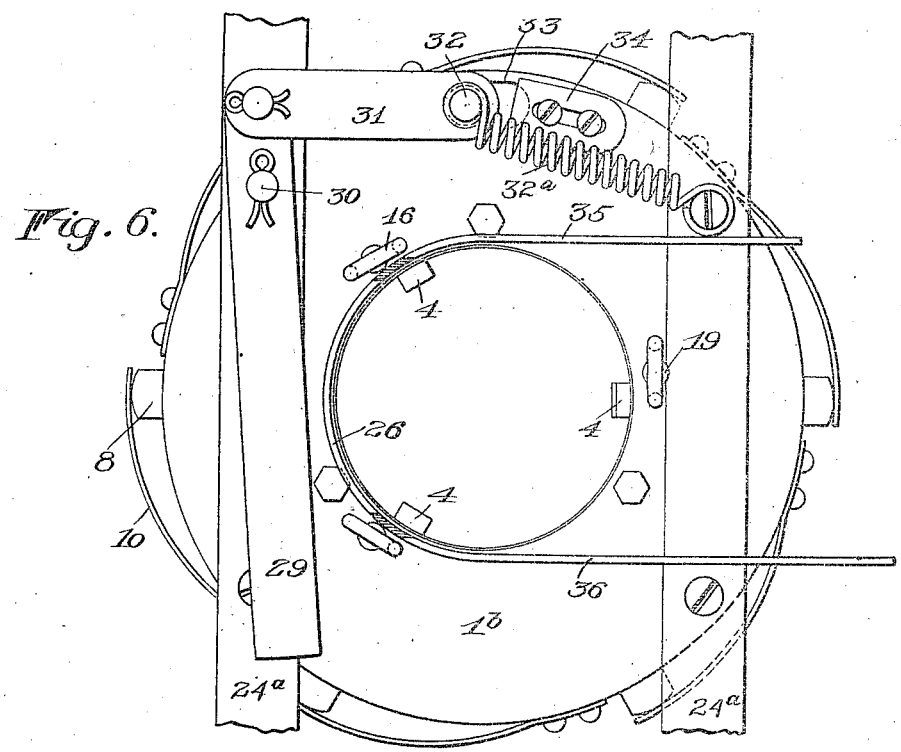
Figure 7:
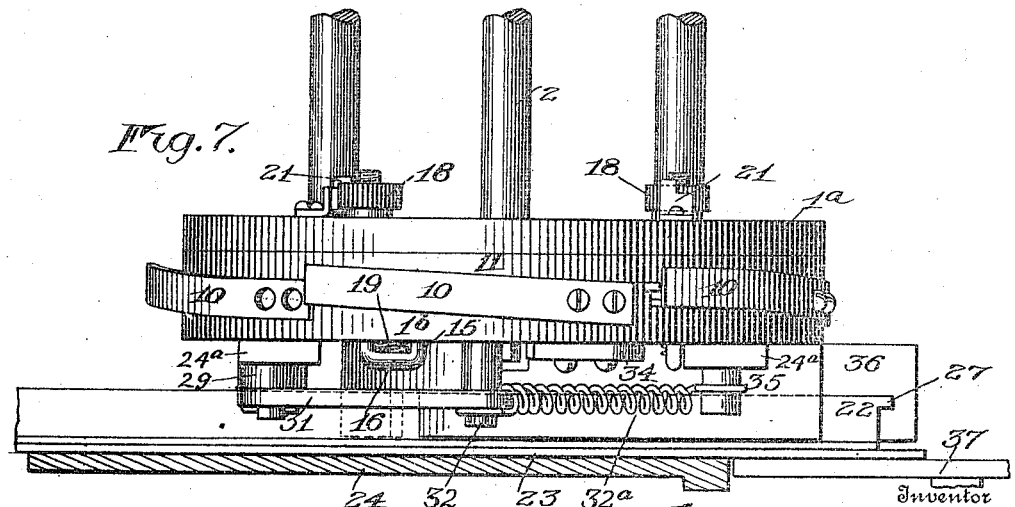

In the drawings, wherein I have shown one embodiment of my invention: Figure 1 represents a plan view. Fig. 2 represents a detail view looking from above and showing the operating means for the supporting and the separating devices. Figs. 3, 4 and 5 represent sections on lines $a$—$a$, $b$—$b$ and $c$—$c$ respectively. Fig. 6 represents a bottom view; and Fig. 7 represents a side view, parts being shown in section.

The embodiment of the invention herein shown comprises a suitable hopper consisting preferably of an annular base and a series of uprights 2 projecting upwardly from the base the base being formed of two ring sections $1^a$ and $1^b$, secured together by bolts. The articles (can tops in the present instance) arranged one upon another and stamped, as usual, with a central boss so that their edges will be spaced as shown in Fig. 4, are sustained within the hopper by suitable supporting devices. The supporting devices are preferably in the form of slides or fingers 4, movable radially of the hopper and operated by a suitable means as a cam member in the form of a ring 5 having a plurality of cams 6 which coöperate with rollers 7 on the slides to effect the projection and withdrawal of the fingers or slides.

Arranged above the supporting devices are the separating devices which separate the lowermost article from the pack and support the remainder while the supporting devices are moved to discharge the separated article. The separating devices are preferably in the form of slides or fingers 8. beveled at their inner ends 9 and movable into the path of the articles in the hopper, being pressed inwardly by springs 10 which are arranged on the exterior of the base frame and engage the outer ends of the slides so that the latter may yield independently of one another, as when one engages the edge of a top, instead of entering the space between two tops. In order to move them simultaneously away from the tops, I provide a suitable mechanism in the form of a cam member or ring 11, having cams 12 engaging rollers 13 projecting upwardly from the slides or fingers, the openings $12^a$ forming the cams being enlarged to permit the slides to yield independently of each other. A connection between the cam members preferably in the form of pins 14 serves to effect their simultaneously movement.

Owing to the fact that some tops are made of metal of a different thickness, it is desirable to adjust the supporting and the separating devices relatively to each other. In the present instance, the supporting devices are adjustable toward the separating devices and for this purpose an arm 15 projects upwardly from an offset portion 16 on the lower end of a rod 17 which extends entirely through the base. This arm 15 bears against the under side of a slide 4 near the inner end of the latter, so that when the arm is moved vertically the effective supporting end of a slide is adjustable relatively to the separating devices. The vertical adjustment of the arm is effected by a nut 18 which engages threads on the upper end of the rod 17 and bears on the top of the hopper base, a spring 19 being arranged in a pocket in the under surface of the base and bearing on the offset portion 16 to tend normally to hold the arm 15 depressed. Indicating means such as a scale 20 on the upper surface of the nut and an index or pointer 21 on the base, serve to determine the adjustment of the supporting devices. As the tops are of circular form there is a tendency when they drop on a smooth surface to roll on their peripheries, and to prevent this rolling they are deposited on two spaced supports 22 which are preferably carried by and arranged longitudinally of a reciprocating feeder or slide 23 guided on a suitable frame 24 between tracks 25 on the latter. The hopper also may be supported on a frame 24 by cross pieces 24$^a$. After a can top is deposited on the slide, the latter moves from beneath the hopper and a device in the form of a curved stop 26, depending from the base of the hopper, engages a can top and causes it to slide off the supports onto the frame 24 in advance of the slide, so that on its forward movement, the forward end of the slide will engage the top to feed it from beneath the hopper to any suitable point. Preferably the forward end of the slide has a recess of V shape to receive the tops and the forward ends of the supports are undercut so that over-hanging projections 27 are formed to prevent the rolling of the tops when they drop from the supports to the frame 24.

In order to effect the operation of the supporting and the separating devices or fingers from the slide, the latter carries an adjustable stop 28 which is adapted to coöperate with the free end of the lever 29 pivoted intermediately of its ends on a pivot pin 30 that depends from a cross piece 24$^a$, and connected at its other end by a link 31 with a pin 32, which is rigidly secured to cam member 11 and works in a slot 33 in the base section 1$^b$. When the lever 29 is engaged by stop 28 the cam rings 5 and 11 are simultaneously rotated to effect the withdrawal of the supporting fingers and permit the projection of the separating fingers, and on the movement of the slide 23 in the other direction the helical spring 32$^a$, which is connected to the pin 32, and one of the cross pieces 24$^a$ moves the cam rings to project the supporting fingers and withdraw the separating fingers. An adjustable stop 34 on the under surface of ring 1$^b$, serves to engage link 31 of the cam operating mechanism in order to vary the movement of the supporting and the separating devices in one direction, while the adjustment of the stop 28 changes the lengths of their movements in the other direction.

The tops are carried by a reciprocatory feeding device between two parallel guides 35 and 36 which form extensions of the curved stop 26, guide 35 being shorter than the guide 36 in order that the can tops may be removed laterally by a suitable carrier 37 which travels beneath the guides and to which the can tops are carried by a slide. The tops may be removed from the carrier in any suitable manner.

In operation the hopper is filled with a number of superimposed tops which owing to their form are spaced from each other at their edges. These tops normally rest upon the lower or supporting slides or fingers 4, and upon the feeding movement of the reciprocatory slide 23 the latter effects the withdrawal of the supporting slides, and the projection of the separating fingers 8 which pass between the lower top and the one next above it, the lower one then dropping onto the spaced supports 22 which prevent the rolling of the tops. The slide 23 now moves to the rear and the top thereon is removed by the stop 26 and deposited in front of the slide, the supporting fingers being at the same time projected and the separating fingers being withdrawn. As the top drops, the rolling is prevented by the projections 27, and upon another forward movement of the slide 23 the top is carried between the guides 35 and 36 to a suitable carrier.

A feeder constructed in accordance with this invention is inexpensive to manufacture and simple in operation, and it effectively separates can tops of the type in which one fits within the other and binds, without injury to said tops.

I claim as my invention:

1. The combination with a hopper, of supporting devices for sustaining articles within the hopper, movable to permit the discharge of the articles, and yieldingly mounted separating devices movable to separate one of the articles in the hopper and to support the remainder while the supporting devices have been moved to discharge the separated article.

2. The combination with a hopper, of a plurality of fingers for sustaining articles in the hopper movable to permit the discharge of the articles, and yieldingly mounted separating devices movable to separate one of the articles in the hopper and to support the remainder while the supporting devices have been moved to discharge the separated article.

3. The combination with a hopper, of a plurality of fingers for sustaining articles in the hopper, movable to permit the discharge of the articles, and a plurality of yieldingly mounted separating fingers arranged above the supporting fingers and movable to separate one of the articles in the hopper and to support the remainder while the supporting fingers have been moved to discharge the separated article.

4. The combination with a hopper, of a plurality of movable supporting fingers for sustaining articles within the hopper, movable to permit the discharge of the articles, a rotary cam member coöperating with said fingers to move them, a plurality of movable separating fingers arranged above the supporting fingers and movable to separate one of the articles and to support the remainder while the supporting fingers have been moved to discharge the separated article and a rotary cam member coöperating with the separating fingers to move the latter.

5. The combination with a hopper, of a plurality of supporting fingers each having a projection thereon, a cam member coöperating with the projections for moving the supporting fingers, a plurality of separating fingers each having a projection thereon, a cam member coöperating with these projections for moving the separating fingers, and connection between said cam members for effecting their simultaneous movement.

6. The combination with a hopper, of a pair of connected cam members, a plurality of fingers for supporting articles within the hopper, operated by one cam member, and a plurality of yieldingly mounted separating fingers arranged above the supporting fingers and operated by the other cam member when the supporting fingers are operated.

7. The combination with a hopper, of a pair of connected rotary cam members, a plurality of radially movable fingers operated by one of said rotary cam members and arranged to support articles within the hopper, and a plurality of radially movable separating fingers arranged above the supporting fingers and operated by the other rotary cam member.

8. The combination with a hopper, of a pair of connected ring shaped members, having cams thereon and mounted to rotate, a plurality of radially movable fingers operated by the cams on one of said rings and arranged to support articles in said hopper, and a plurality of radially movable separating fingers arranged above the supporting fingers and operated by the cams on the other ring.

9. The combination with a hopper, of a pair of connected ring shaped members having cams thereon and mounted to rotate, a plurality of radially movable fingers operated by the cams on one of said rings and arranged to support articles in said hopper, and a plurality of radially movable separating fingers yieldingly arranged above the supporting fingers and operated by the cams on the other ring.

10. The combination with a hopper, of a plurality of fingers for supporting articles in the hopper radially movable to effect the discharge of the articles, a rotary cam ring having cams for moving the fingers into and out of supporting positions, a plurality of separating fingers for separating one article and supporting the remainder while the separated article is discharged, a rotary cam ring having cams thereon for moving the fingers from the articles, and springs for moving the separating fingers toward the articles.

11. The combination with a hopper and supporting devices for holding the articles within the hopper, movable to discharge the articles, of separating devices for separating one article and supporting the remainder, and mechanism for moving the separating devices, permitting them to yield independently of each other.

12. The combination with a hopper and supporting devices for holding the articles within the hopper, movable to discharge the articles, of separating devices for separating one article and supporting the remainder, the supporting and the separating devices being relatively adjustable to feed articles of different thickness.

13. The combination with a hopper and supporting devices for holding the articles within the hopper, movable to discharge the articles, of separating devices for separating one article and supporting the remainder, and means for adjusting the supporting and the separating devices relatively to each other to feed articles of different thickness.

14. The combination with a hopper, of a plurality of radially arranged slides for sustaining articles in the hopper, a cam coöperating with the slides for operating them, a plurality of separating devices arranged above the slides, and means coöperating with the slides near their inner ends to adjust them relatively to the separating devices.

15. The combination with a hopper and supporting devices for holding the articles within the hopper, movable to discharge the articles, of separating devices for separating one article and supporting the remainder, means for adjusting the supporting and the separating devices relatively to each other to feed articles of different thickness, and means for indicating the adjustment.

16. The combination with a suitable hopper having a base, of a plurality of articles supporting slides radially movable in the base, a plurality of separating slides radially movable in the base, and means for adjusting a supporting slide relatively to a separating slide comprising a rod extending through the base, an upwardly extending arm offset from the rod and engaging a supporting slide, a spring for moving the arm in one direction, and a nut engaging the rod and the base.

17. The combination with a suitable hopper, of a slide movable beneath the same, a pair of spaced supports carried by the slide to receive an article from the hopper, and a device removing the article from the supports and depositing it in advance of the slide so that it may be fed by the latter.

18. The combination with a hopper, of supporting devices for articles in the hopper, a rotary cam for moving said devices to discharge the articles, a feeding device for moving the discharged articles and mechanism controlled by the feeding device for controlling the operation of the cam of the supporting devices.

19. The combination with a hopper, of supporting devices for articles in the hopper, a rotary cam for moving said devices to discharge the articles, a feeding slide receiving the discharged articles, mechanism for controlling the movement of the cam for operating the supporting devices, operated by the slide, and a device for removing articles from the slide and depositing it in advance of the slide.

20. The combination with a hopper, of supporting devices for articles in the hopper, movable to discharge the articles, a feeding slide receiving the discharged articles, a pair of spaced supports carried by the slide to receive articles from the hopper, a stop for removing articles from the supports and depositing them in advance of the slide, and mechanism controlled by the slide for operating the supporting devices.

21. The combination with a hopper, of a feeding slide arranged beneath the hopper to receive the articles discharged therefrom, and having its forward end provided with an overhanging projection to prevent the rolling of the articles to be fed by the slide.

22. The combination with a hopper, of a feeding slide arranged beneath the hopper, and having its forward end recessed and provided with an overhanging projection, spaced supports carried by the slide, and a device for removing the articles from the supports and depositing them in advance of the recessed end of the said slide.

23. The combination with a hopper, of a plurality of fingers for supporting articles in the hopper and radially movable to the discharge of the articles, a rotary cam ring having cams for moving the fingers into and out of supporting positions, a plurality of separating fingers for separating one article and supporting the remainder while the separated article is discharged, a rotary cam ring having cams thereon for moving the fingers from the articles, springs for moving the separating fingers toward the articles, a slide movable beneath the hopper, a lever operated by the slide, and a link connecting the lever and one of the cam rings.

FRED WEGNER.

Witnesses:
G. H. KELLOGG,
J. S. CARMER.